Dec. 11, 1923.
1,477,368
E. KOTTUSCH
PISTON RING
Filed Feb. 21, 1922
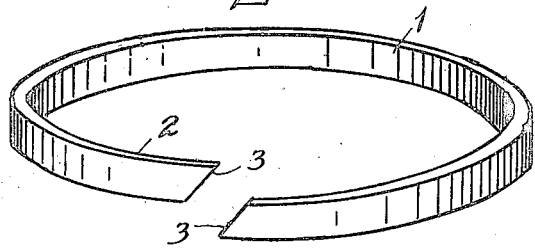
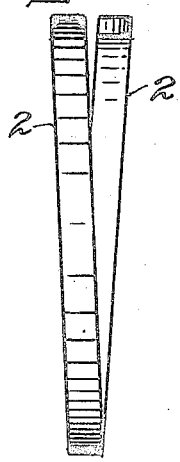
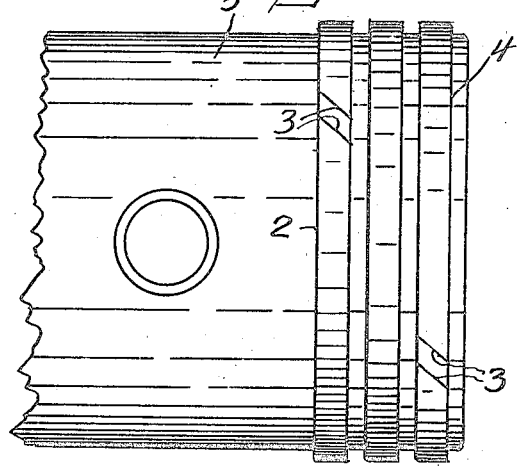
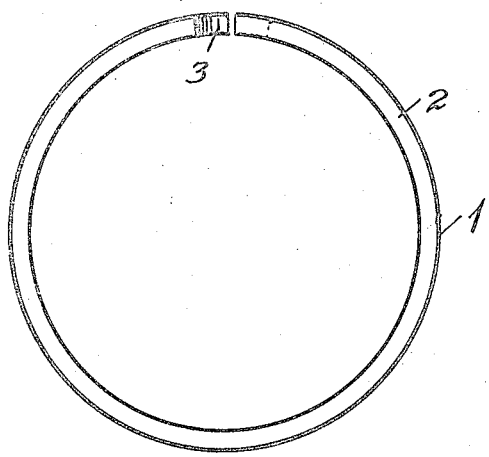
INVENTOR.
Emil Kottusch
BY W. J. Wynn
ATTORNEYS.

Patented Dec. 11, 1923.

1,477,368

UNITED STATES PATENT OFFICE.

EMIL KOTTUSCH, OF GREENVILLE, MISSISSIPPI.

PISTON RING.

Application filed February 21, 1922. Serial No. 538,405.

*To all whom it may concern:*

Be it known that I, EMIL KOTTUSCH, a citizen of the United States, and a resident of Greenville, in the county of Washington and State of Mississippi, have invented new and useful Improvements in Piston Rings, of which the following is a specification.

This invention relates to piston rings and has for its principal object the provision of a ring which will be free to move within the groove in the piston, but which will exert such a pressure upon the walls of the groove that it will not rattle in the groove or rotate too freely therein.

A further object of the invention is to provide a piston ring of simple and cheap construction which may be conveniently applied to pistons having grooves of the ordinary type and which will not exert too great pressure upon the cylinder walls.

Other and further objects of the invention will be apparent in the following description, reference being had to the accompanying drawings.

Figure 1 is a perspective view of a preferred embodiment of my invention;

Fig. 2 is a side elevation of the ring shown in Fig. 1, the split portion being shown at the top;

Fig. 3 is a side elevation taken at right angles to the split portion;

Fig. 4 is a fragmentary view of a piston showing rings mounted within the grooves and Fig. 5 is a plan view of a ring.

A cast iron tube is placed upon a lathe and rotated slowly while a cutter splits the tube longitudinally in a spiral, the spiral being at about an angle of forty-five degrees to a plane passing through the tube at right angles to its axis at any point throughout its length. The tube is then placed upon another lathe beside which a high speed cutter is mounted to travel longitudinally of the tube for a distance about equal to the width of the ring during a single revolution of the tube. The cutter cuts through the whole thickness of the wall of the tube, cutting both sides of the ring at a single operation.

It will be evident that at each complete revolution of the tube a segment will be entirely severed when the longitudinal spiral cut is reached. The severed segment will be in the form of a worm thread as indicated in Figs. 1, 2 and 3, and since the distance between the cutting edges of the rotating cutter remains constant the ring will have a constant width throughout its periphery, and no grinding of the sides or edges will be necessary.

The finished ring 1 will thus have smooth edges 2, and the abutting faces 3 of the free ends of the ring will lie at an angle of about forty-five degrees to the sides 2. Placed within the grooves 4 of a piston 5, the spiral rings will exert sidewise pressure against the walls of the grooves and the greatest pressure will occur at the free ends of the rings adjacent to the faces 3. A ring will be placed in position within the groove by inserting one end of the ring over the wall at the end of the cylinder into the groove 4 and then by turning or screwing the ring around or by forcing the ring circumferentially upon the cylinder the ring can be snapped into position in the outer groove. The end which exerts pressure upon the inner wall of the groove will then be elevated to permit the ring to spring sidewise toward the next groove and the ring may then be gradually turned or screwed from the first groove into the second and so on.

It has been found in practice that if a ring is cut as a segment of a cylinder with its sides lying in planes at right angles to the axis of the cylinder, then split and distorted by pressing the split ends apart sidewise, producing a spiral-like configuration, when the ring is heated as by placing it upon a hot surface, the strains produced within the metal by the sidewise distortion will be relieved by the process of heating, and the ring will assume its original cylindrical shape with its sides in substantially parallel planes.

On the contrary, if a ring is severed from a cylinder as a segment of a spiral so that its ends are normally separated sidewise as indicated in Figs. 2 and 3, the ring may be heated to redness, and while so heated may be pressed between parallel plates and allowed to cool while under pressure and after the pressure is relieved, the ends will at once spring sidewise so that the ring will be in its original spiral form.

The ring will be cut to a width which will be only about one-thousandth of an inch narrower than the width of the groove in the piston, and when it is inserted within the groove the sidewise pressure produced by the resilience of the metal attempting to assume its spiral shape will exert such friction upon the walls of the groove that although the ring will be free to turn slowly within the groove and will so turn in practice, this circumferential movement will not be rapid and will not result in a wearing down of the side walls of the groove or the side walls of the ring until the wear upon the outer periphery of the ring is sufficient to necessitate replacement.

It has hitherto been proposed to use spiral piston rings consisting of a plurality of spirals, but when the rings are made of the necessary thickness, the pressure exerted upon the cylinder wall by a ring constructed with a plurality of turns is too great whereas with present ring the outward pressure upon the cylinder walls is no greater than the pressure exerted by piston rings as ordinarily constructed.

Careful experimental work with rings of the present construction in light engines and also in engines used upon heavy trucks under severe traffic conditions have demonstrated that a ring of the construction herein described has an unusual length of life and that pumping of oil is substantially entirely eliminated.

I claim:—

In combination, a piston having a groove formed therein, the side walls of said groove lying in substantially parallel planes at right angles to the axis of said piston, and a ring within the groove exerting pressure upon the side walls thereof, said ring normally having a form of a worm thread of a single turn, the width of the ring being less than the width of the groove within the piston by an amount sufficient to permit circumferential movement of the ring within the groove.

In testimony whereof I have signed my name to this specification in the presence of two subscribing witnesses in the State of Mississippi, Washington County, this the 18th day of February, 1922.

EMIL KOTTUSCH.